Patented Nov. 3, 1936

2,059,286

UNITED STATES PATENT OFFICE 2,059,286

METHOD OF SEWAGE DISPOSAL

Noel Statham, Irvington-on-Hudson, N. Y.

No Drawing. Application January 26, 1935, Serial No. 3,672

8 Claims. (Cl. 210—2)

My present invention relates to sewage disposal. According to methods now in vogue, sewage is first subjected to a series of screening and thickening steps so as to separate it into a more or less clear effluent and a concentrate or sludge. The sludge is placed in treating tanks, as for example of the separate digestion type, in which it is subjected to bacterial action which effects decomposition of the putrescible matter. If necessary, the mass may be seeded with a portion of sludge undergoing active bacterial decomposition in order to start the action. In the Imhoff type of tank, the digestion takes place in chambers in the bottom of the tank, into which chambers the sludge falls during the flow of the sewage through the tank. A period of several months is usually required for the completion of the bacterial action and the formation of a more or less inodorous filterable residue. The effluent from the thickening step is also treated for further clarification as by subjecting it to the action of bacteria with or without air and of chemical precipitants, etc.

I have now discovered that the above described bacterial action on the sludge is greatly accelerated by the presence of activated carbon in suitable quantities which appears to catalyze the decomposing action of the bacteria and/or their accompanying enzymes. The improved action of the activated carbon is shown by the modification of several factors among which may be mentioned the following: (1) Decrease in time required for treatment in digestion tanks. In some instances the time required for the formation of a filterable residue of satisfactory odor is cut down from six months to three months or less; (2) a substantial rise in the temperature of the sludge undergoing digestion; (3) increase in the percent ash in the sludge as for example from a normal 25-35 to as high as 62, indicating a marked increase in the reduction of volatile matter in the sludge; (4) in a given installation the reduction in the B. O. D. (bio-chemical oxygen demand) of the sludge treated in the presence of activated carbon was in excess of 41%, whereas without the activated carbon the B. O. D. reduction was only 10.8%; (5) an increase in gas production of nearly 100% over operations without the presence of activated carbon. This gas increase not only represents more intensive decomposition but constitutes additional fuel utilizable for many purposes connected with sewage disposal; (6) the supernatant liquor from the digestion tanks is clearer with the use of activated carbon, showing a reduction of suspended matter and less scum at the surface.

In carrying out my improved process I prefer to add the activated carbon just prior to the thickening steps, and subsequent, say, to the preliminary screening steps, whereby the bulk of the carbon so added is carried along with the sludge and is present during the bacterial decomposition which is subsequently effected, while a small amount of the carbon is retained by the effluent and assists in its purification. While the amount of activated carbon may be varied widely, I have found the quantity on the order of three to ten parts per million parts of sewage to be satisfactory. The beneficial effect of the activated carbon has been especially noticeable in the case of anaerobic digestion, but it is also of considerable advantage in the so-called activated sludge processes (which depend upon aerobic digestion) particularly in facilitating the disposition of the sludge which is formed.

The activated carbon which I have found most effective is that characterized by a high degree of activity, such as the type of activated carbon known to the trade as "Aqua Nuchar" having a phenol value of 25. This carbon is derived from the so-called waste liquor in the soda process for obtaining wood pulp. This liquor contains chemically dissolved intercellular material from the wood, and when concentrated, carbonized and activated by known methods, yields material of very high adsorptive power and low specific gravity. This low gravity is of advantage in that the carbon settles slowly and thereby is in contact with the watery material for a long period. However, I am not limited to this particular activated carbon, as any activated carbon having a phenol value of say 20-40 is satisfactory. The activated carbon used should preferably have a particle size of between 100 and 300 mesh. The phenol value of the activated carbon is the parts per million of activated carbon required to reduce the phenol concentration—for instance in water—from .10 to .01 part per million.

The use of carbon in one form or another has previously been proposed in connection with sewage disposal but in such cases conditions were unfavorable for bacterial activity and it was not intended that the bacteria should play any part in the sewage treatment. My invention is distinguished from such prior proposals in that I use carbon of a high degree of activation and utilize the discovery that activated carbon profoundly catalyzes the bacterial action.

While I am not prepared at this time to state the exact nature of the action of the activated carbon in speeding up the bacterial and/or enzymic action, the results to date indicate that it is of catalytic character, perhaps becoming a carrier for the enzymes and distributing these throughout the organic matter in the sludge and thereby effecting a more rapid digestion. A further reason for the increase in bacterial action may be the adsorption of materials inimical to, or retarding, bacterial action.

In addition to the favorable influence of activated carbon on the bacterial action during the digestion period, it also acts in other ways as by favoring the floc formation and promoting settling in the early sedimentation periods. Its favorable action during these periods is also shown by reduction in the scum formation and the production of a clearer effluent. When the effluent has been subjected to the action of activated carbon, as when it contains a slight amount in suspension, and is then sprayed upon filters of the trickling type, there is a noticeable reduction of odors. Also, a better floc is formed, less scum is formed on the tank and an improved effluent discharged from the plant when a small amount of activated carbon is present in the effluent from the sprinkling filters before it undergoes secondary sedimentation.

Referring again to the digestion period, it may be pointed out that the improved digestion had with the use of the activated carbon results not only in a very much smaller bulk of completely digested sludge which must be handled, but such sludge is easier to filter and easier to dry whether by the old process in glass houses or by the use of rotary dryers. Thus, a saving in equipment, in investment and in ground area occupied by the complete plant results, such saving being especially important when a new plant is to be built.

My invention is further useful in that it enables various effluents, such as those from canning plants, tanneries, etc., to be subjected to bacterial treatment, which effluents at the present time are not so treated because present methods are inefficient. It is further useful in connection with the ordinary septic tanks, the periodical addition to which of small amounts of activated carbon serves to keep them from becoming foul and blocked with scum.

It will be understood that the amount of activated carbon used will vary considerably, not only with variation in the type of sewage or other effluent but also upon temperature conditions. Thus, my invention is of particular advantage in the wintertime when it enables bacterial action to proceed because of the rise in temperature created, without which such action would either not take place at all or would be too slight to be of any benefit. During the hot months, if desirable, the amount of carbon may be cut down. In some of the more modern plants where the sludge is decomposed in separate digestion tanks, part of the gas generated is used in heating the contents of the digester, in which event, the bacterial action continues throughout the winter months, and the detention period in such tanks is reduced sometimes to a period of days. In such cases, the major effect of the activated carbon is in the direction of increasing the destruction of organic material and formation of a larger amount of gas. The gas necessary for the digestion process may also be reduced and the excess gas used for power purposes, lighting or heating of the plant.

I claim:

1. In a system of sewage disposal involving the action of bacteria to effect decomposition of the putrescible material, the step which consists in adding activated carbon to such sewage and carrying out the bacterial digestion in the presence of such carbon.

2. In a system of sewage disposal involving the action of bacteria to effect decomposition of the putrescible material, the steps of thickening the sewage as received and incorporating in the sludge produced a quantity of activated carbon and carrying out the bacterial digestion in the presence of such carbon whereby the time for digestion is cut down.

3. The process according to claim 2 in which the amount of activated carbon is on the order of 3 to 10 parts of carbon per million parts of sewage.

4. In a system of sewage disposal involving the action of bacteria to effect decomposition of the putrescible material, the step which consists in adding activated carbon into the sewage and carrying out the bacterial digestion under anaerobic conditions.

5. In a system of sewage disposal involving the action of bacteria to effect decomposition of the putrescible material, the steps of thickening the sewage as received, but prior to the thickening step adding a quantity of activated carbon whereby the major part of such carbon is added to the sludge produced and is present in the bacterial digestion while a minor portion of such carbon is carried away in the effluent from the thickening step and is effective in promoting the purification of such effluent.

6. In a system of sewage disposal involving the action of bacteria to effect decomposition of the putrescible material, the steps of carrying out digestion of the sewage under aerobic conditions and incorporating in the sludge produced a small quantity of activated carbon.

7. In the disposal of industrial effluents, particularly those from tanneries, canning operations and the like, by the action of bacteria to effect decomposition of the putrescible material, the step which consists in adding activated carbon to such effluents and carrying out the digestion in the presence of such carbon.

8. In a system of sewage disposal involving the action of bacteria to effect decomposition of the putrescible material, the step which consists in adding activated carbon derived from waste liquor in the soda process of obtaining wood pulp to such sewage and carrying out the bacterial digestion in the presence of such carbon.

NOEL STATHAM.